United States Patent [19]
Woodward

[11] Patent Number: 5,843,764
[45] Date of Patent: Dec. 1, 1998

[54] METHOD FOR SEPARATING THE NON-INKED CELLULOSE FIBERS FROM THE INKED CELLULOSE FIBERS IN CELLULOSIC MATERIALS

[75] Inventor: Jonathan Woodward, Kingston, Tenn.

[73] Assignee: Martin Marietta Energy Systems, Inc., Oak Ridge, Tenn.

[21] Appl. No.: 375,200

[22] Filed: Jan. 18, 1995

Related U.S. Application Data

[63] Continuation-in-part of Ser. No. 65,846, May 21, 1993, abandoned.

[51] Int. Cl.$^6$ .............................. D21C 1/00; D21C 3/00
[52] U.S. Cl. ......................... 435/277; 435/278; 435/209; 435/99
[58] Field of Search .................................. 435/277, 278, 435/209, 99

[56] References Cited

U.S. PATENT DOCUMENTS

| | | | |
|---|---|---|---|
| 2,280,307 | 4/1942 | Diehm ......................................... | 195/8 |
| 3,041,246 | 6/1962 | Bolanski et al. ............................ | 195/8 |
| 4,220,721 | 9/1980 | Emert et al. .............................. | 435/165 |
| 4,298,013 | 11/1981 | Semp et al. ............................. | 131/308 |
| 4,321,328 | 3/1982 | Hoge ........................................ | 435/165 |
| 4,461,648 | 7/1984 | Foody ........................................ | 127/37 |
| 4,628,029 | 12/1986 | Everleigh et al. ......................... | 435/99 |
| 4,745,058 | 5/1988 | Townsley ................................. | 435/101 |
| 5,116,474 | 5/1992 | Fuentes et al. ............................ | 162/71 |
| 5,123,962 | 6/1992 | Komuro et al. ...................... | 106/163.1 |
| 5,308,449 | 5/1994 | Fuentes et al. ............................ | 162/72 |

FOREIGN PATENT DOCUMENTS 2 231 595   11/1990   United Kingdom ............. D21C 5/02

OTHER PUBLICATIONS

Jonathan Woodward and Susan L. Arnold, "The Inhibition of B–Glucosidase Activity in *Trichoderma reesei* C30 Cellulase by Derivatives and Isomers of Glucose," Biotechnology and Bioengineering, vol. XXIII, (1981) pp. 1553–1562.

Tuula T. Terri, "The Cellulolytic Enzyme System of *Trichoderma reesei*," Technical Research Centre of Finland, Publications 38, May 1987.

Jim Young, "Cellulose du Pin's Biotech Research Moves Into Commercial Production," Pulp & Paper, vol. 63, No. 9, (1989) pp. 234–235.

Jean–Claude Pommier, "Biotechnology in Papermaking: Dream or Impending Reality," Institute of Paper, Sci. & Tech., Rev. ATIP 44(3): (1990) pp. 125–132.

Jean–Claude Pommier, "Time for Enzymes?," Chemicals and Additives, vol. 214, No. 5, (Oct. 1990) pp. 34–35.

Jean–Claude Pommier, Gerard Goma, Jean–Luc Fuentes and Christian Rousset, "Using Enzymes to Improve the Process and the Product Quality in the Recycled Paper Industry," Tappi Journal (1990) pp. 197–200.

A. Shrinath, J.T. Szewczak, and I. Jerry Bowen, "A Review of Ink–Removal Techniques in Current Deinking Technology," Tappi Journal (1991) pp. 85–93.

John A. Heitmann, Jr. and Thomas W. Joyce, "Paper Recycling," Progress in Paper Recycling (1991/92) pp. 19–23.

Duggirala Y. Prasad, John A. Heitmann and Thomas W. Joyce, "Enzyme Deinking of Black and White Letterpress Printed Newsprint Waste," Progress in Paper Recycling (1992) pp. 21–30.

L. Scott Jackson, John A. Heitmann and Thomas W. Joyce, "Enzymatic Modifications of Secondary Fiber," Tappi Journal, vol. 76, No. 3 (1993) pp. 147–154.

Duggirala Y. Prasad, John A. Heitmann and Thomas W. Joyce, "Enzymatic Deinking of Colored Offset Newsprint," Nordic Pulp and Paper Research Journal, No. 2 (1993) pp. 284–286.

Primary Examiner—Michael G. Wityshyn
Assistant Examiner—Francisco C. Prats
Attorney, Agent, or Firm—Preston Smirman

[57] ABSTRACT

A method for enzymatically separating the non-inked cellulose fibers from the inked cellulose fibers in cellulosic materials. The cellulosic material, such as newsprint, is introduced into a first chamber containing a plastic canvas basket. This first chamber is in fluid communication, via plastic tubing, with a second chamber containing cellobiase beads in a plastic canvas basket. Cellulase is then introduced into the first chamber. A programmable pump then controls the flow rate between the two chambers. The action of cellulase and stirring in the first chamber results in the production of a slurry of newsprint pulp in the first chamber. This slurry contains non-inked fibers, inked fibers, and some cellobiose. The inked fibers and cellobiose flow from the first chamber to the second chamber, whereas the non-inked fibers remain in the first chamber because they are too large to pass through the pores of the plastic canvas basket. The resulting non-inked and inked fibers are then recovered.

12 Claims, 3 Drawing Sheets

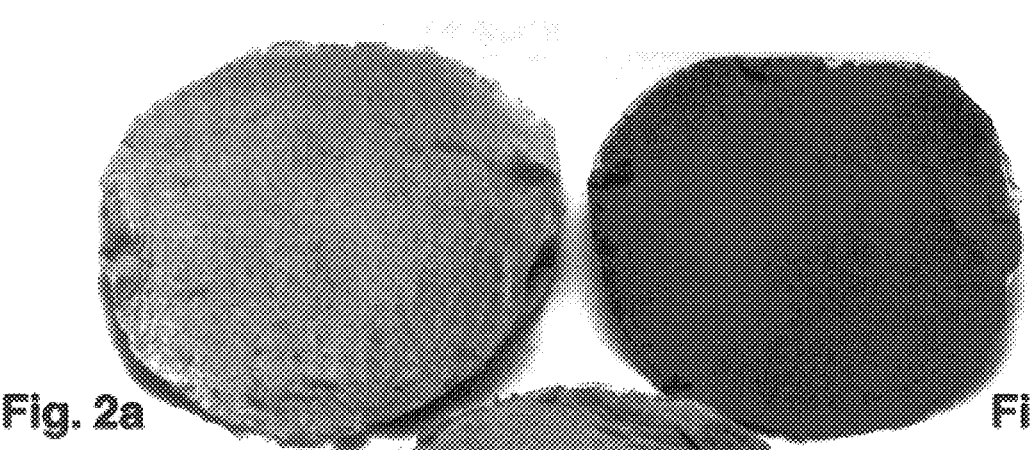
Fig. 2a  Fig. 2b
Fig. 2c

 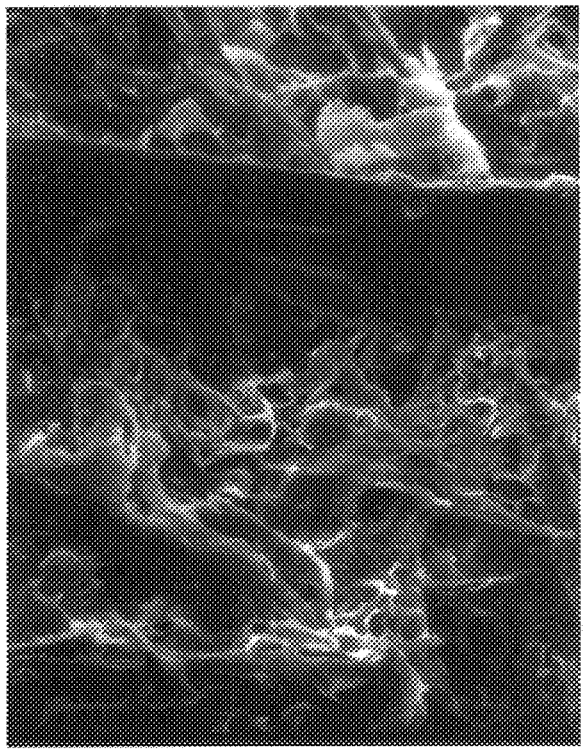
Fig. 3a     25 μ     Fig. 3b 5,843,764

METHOD FOR SEPARATING THE NON-INKED CELLULOSE FIBERS FROM THE INKED CELLULOSE FIBERS IN CELLULOSIC MATERIALS

CROSS-REFERENCE TO RELATED APPLICATION

This application is a continuation-in-part application of U.S. patent application Ser. No. 08/065,846, filed on May 21, 1993 now abandoned, the entire disclosure of which is incorporated herein by reference.

This invention was made with Government support under contract DE-AC05-84OR21400 awarded by the Division of Chemical Sciences, Office of basic Energy Sciences, U.S. Department of Energy to Martin Marietta Energy Systems, Inc. and the Government has certain rights in this invention.

FIELD OF THE INVENTION

The present invention relates to the recycling of cellulosic materials, and more particularly to a method for the enzymatic separation of the non-inked cellulose fibers from the inked cellulose fibers in printed material, such as newsprint.

Solid waste materials are continuing to increase in volume at the same time that disposal of such material is becoming more difficult and expensive. As a result, there is increasing interest in recycling. Of particular interest is the large amount of waste cellulosic materials. Cellulosic materials are generally defined as those materials which contain cellulose. Cellulosic materials include wood, woody pulp, woody biomass, paper, newsprint, cardboard and related materials. Paper is generally defined as felted or matted sheets of cellulose fibers formed on a fine-wire screen from a dilute water suspension, and bonded together as the water is removed and the sheet is dried. As a result of recycling these cellulosic materials the problem of disposal of solid wastes would be partially alleviated.

Although conservation efforts have had a significant impact, the volume of waste cellulosic material remains quite large and will probably continue to increase in the foreseeable future. A large amount of this material is either deposited in landfills or incinerated, whereas only a small amount is recycled. Due to environmental restrictions and a lack of suitable new sites, disposal by landfill or incineration is becoming prohibitively expensive or even impossible in certain areas.

A significant portion of waste paper is comprised of newsprint. Newsprint is generally defined as the paper used in the publication of newspapers. Newsprint is an impermanent material made from mechanical wood pulp, with some chemical wood pulp. Wood pulp is generally defined as the cellulosic material produced by reducing wood mechanically or chemically which is used in making paper and cellulosic products.

Currently, there is no known method for the separation of non-inked fibers from the inked fibers in newsprint. Current methods for de-inking involve the pulping of the whole paper in the presence of chemicals, such as caustic sodium hydroxide, diethylenetriaminepentaacetic acid, sodium silicate, hydrogen peroxide, and a surfactant, followed by various washing and flotation operations. The resulting product is a mixture of high and low quality de-inked secondary fibers and a wastewater stream that has to be rendered harmless prior to its discharge into the environment.

Additionally, water-based inks are particularly problematic because of the difficulties in recovering the ink particles after their release from the newsprint by chemical treatment. Only a small percentage of the domestic newsprint market utilizes water-based inks. The use of such inks would be preferable from an environmental standpoint.

What is needed is a method for the physical separation of the inked fibers from the noninked fibers in cellulosic materials, such as newsprint, which produces high quality fibers and does not use expensive, environmentally polluting chemicals.

OBJECTS OF THE INVENTION

Accordingly, it is an object of the present invention to provide a new and improved method for recycling cellulosic materials.

It is another object of the present invention to provide a new and improved method for recycling paper.

It is another object of the present invention to provide a new and improved method for recycling newsprint.

It is another object of the present invention to provide a new and improved method for the separation of the non-inked fibers from the inked fibers in newsprint.

It is another object of the present invention to provide a new and improved method for the separation of the non-inked fibers from the inked fibers in newsprint whereby de-inking chemicals are not used.

It is another object of the present invention to provide a new and improved method for the separation of the non-inked fibers from the inked fibers in newsprint whereby the non-inked fibers are high-quality secondary fibers that can be recycled without further chemical treatment.

It is another object of the present invention to provide a new and improved method for the separation of the non-inked fibers from the inked fibers in newsprint whereby the ink is not released to any significant extent from the inked fibers.

It is another object of the present invention to provide a new and improved method for the separation of the non-inked fibers from the inked fibers in newsprint whereby the ink may be either water- or oil-based.

Further and other objects of the present invention will become apparent from the description contained herein.

SUMMARY OF THE INVENTION

In accordance with one aspect of the present invention, the foregoing and other objects are achieved by:

introducing cellulosic material into a first vessel, the cellulosic material comprising cellulose, the cellulose comprising non-inked cellulose fibers and inked cellulose fibers;

reacting the cellulosic material with cellulase to form a slurry, the reaction causing the cellulosic material to separate into non-inked cellulose fibers and inked cellulose fibers, the slurry comprising non-inked cellulose fibers, inked cellulose fibers, and cellobiose;

transferring the slurry through a first retaining means in the first vessel to retain the noninked cellulose fibers in the first vessel;

transferring the slurry from the first vessel into a second vessel, the slurry comprising individual inked fibers cellulose fibers, the first vessel being in fluid communication with the second vessel;

transferring the slurry through a second retaining means in the second vessel for retaining the inked cellulose fibers in the second vessel;

recovering the non-inked cellulose fibers; and recovering the inked cellulose fibers.

BRIEF DESCRIPTION OF THE DRAWINGS

FIG. 2A is a photographic illustration of the non-inked fibers recovered from newsprint in chamber A of the present invention.

FIG. 2B is a photographic illustration of the inked fibers recovered from newsprint in chamber B and other parts of the apparatus of the present invention.

FIG. 2C is a photographic illustration of the non-inked fibers from newspaper that has not been printed on.

FIG. 3A is a photomicrographic illustration of the non-inked fibers recovered from newsprint in chamber A of the apparatus illustrated in FIG. 1.

FIG. 3B is a photomicrographic illustration of the inked fibers recovered from newsprint in chamber B and other parts of the apparatus illustrated in FIG. 1.

DETAILED DESCRIPTION

Figure 1:
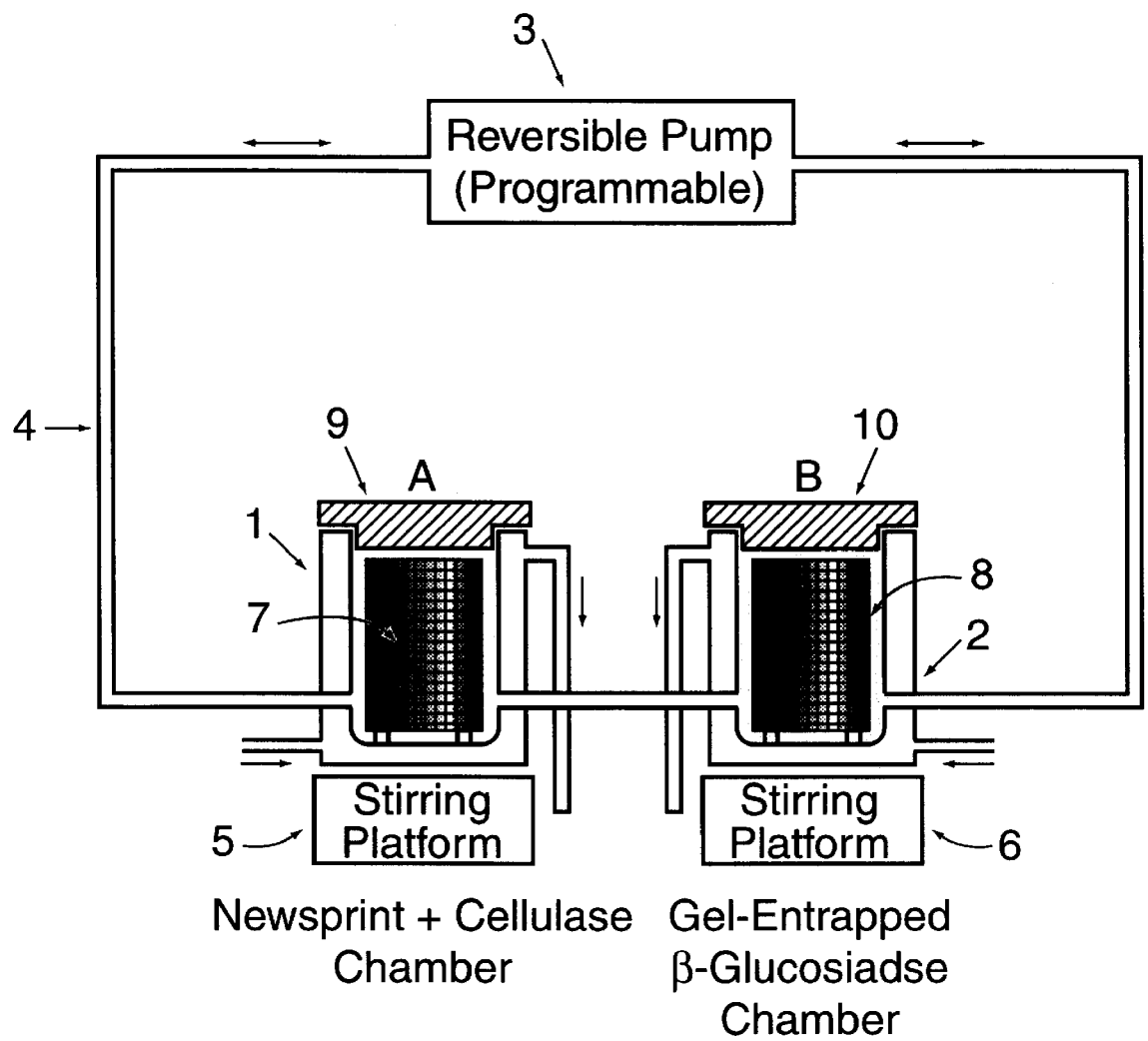
FIG. 1 is a schematic illustration of a reactor configuration for carrying out the present invention.

The present invention claims a method for the physical separation of the non-inked fibers from the inked fibers in newsprint. The separation is effected by the action of the enzyme cellulase on newsprint in conjunction with the flow of a liquid through a bioreactor and a plastic canvas basket containing newsprint. The plastic canvas basket contains a plurality of small pores which permit the smaller inked fibers to pass through, while preventing the larger non-inked fibers from passing through. As a result of this method, the non-inked fibers are not damaged, unlike the inked fibers.

In previous methods there was no separation of the non-inked from the inked fibers, and subsequently the deinked fibers were a mixture of high-quality and low-quality damaged fibers. The present invention claims a method for the separation of such high-quality and low-quality damaged fibers. The present invention produces non-inked fibers that are high-quality secondary fibers that can be recycled without any further chemical treatment.

The inked fibers generated by the present invention are low-quality damaged fibers that can be recycled for miscellaneous uses such as the manufacture of molded products, highway seeding, shredded packaging and insulation. The present invention is suitable for separating the non-inked fibers from the inked fibers in both oil- and water-based newsprint, magazines, telephone directories, letterpress, lithographic newsprint, xerographic paper, and laser-printed paper.

The present invention does not require the use of surface-active deinking chemicals because the invention does not require or seek to achieve deinking. Since the present invention does not require deinking chemicals, it eliminates an energy-intensive and costly process for the treatment of any wastewater stream generated by conventional deinking technologies. Because the present invention is not directed to deinking, per se, most of the ink remains attached to the inked fibers. Therefore, recovery of released ink is not a major requirement of the present invention.

With reference to FIG. 1, the reactor configuration of one embodiment of the present invention consists of a first vessel 1 (denominated as chamber A), a second vessel 2 (denominated as chamber B), a pump 3 (preferably programmable), and tubing 4 (preferably insulated) which connects all three of these objects. Stirring platforms 5 and 6 can be placed underneath their respective vessels, in order to agitate the contents of the vessels. It should be noted that the vessels can be thermojacketed in order to ensure that the vessels are maintained at a desired temperature. Inside each of the vessels are plastic canvas baskets 7 and 8. Finally, lids 9 and 10 are used to seal their respective vessels, in order to avoid spillage.

During an experiment, cellulase was employed to hydrolyze the cellulose in a sample of newsprint (water-based ink) in the reactor configuration shown in FIG. 1. It should be noted that the sample of newsprint, or cellulosic material in general, does not have to be significantly size-reduced before being processed according to the present invention. However, initial size-reducing of the cellulosic material (i.e. shredding, tearing, grating, slicing) may be preferable due to the resulting increased surface area. Cellulase is generally defined as a group of extracellular enzymes, produced by various fungi and bacteria that hydrolyze cellulose. After approximately six hours, it was observed that the inked fibers had accumulated on the outside (external surface) of the plastic canvas (20-mesh) basket in chamber B. The term chamber is to be considered equivalent to the terms vessel, reaction vessel, container, receptacle, bioreactor and other related devices. Conversely, non-inked fibers were found on the inside (internal surface) of the plastic canvas basket in chamber A. The non-inked fibers in chamber A were removed, washed and filtered. They are shown in FIG. 2A. The collected inked fibers are shown in FIG. 2B. Although the brightness of the non-inked fibers has not been determined as of yet, newspaper that had not been printed on was also subjected to the separation procedure as described below. The fibers recovered from the plastic canvas basket in chamber A appeared to have similar brightness to the non-inked fibers from newsprint (FIG. 2C). The non-inked fibers were determined to be high quality based upon their appearance by scanning electron microscopy (FIG. 3A) as whole fibers typical of virgin fibers. However, the inked fibers did not appear whole but appeared damaged (FIG. 3B). The experimental protocol of an embodiment of the present invention is presented in detail below.

The enzyme Celluclast™ was obtained from Novo Nordisk Bioindustrials, Inc.™, Danbury, Conn. Celluclast™ is a mixture of various enzymes which generally contains approximately 80% 1,4-β-D-Glucan cellobiohydrolase, approximately 15% 1,4-β-D-Glucan glucanohydrolase, and approximately 5% 1,4-β-D-Glucosidase. Celluclast™ is generally produced by the fungus *Trichoderma reesei*. Celluclast™ is able to hydrolyze the β(1–4) bonds in cellulose to release cellobiose from the nonreducing ends of the chains, and randomly hydrolyze the β(1–4) bonds in cellulose yielding oligosaccharides, and hydrolyze the β(1–4) bonds in the latter (oligosaccharides) and cellobiose so as to remove successive glucose units. Cellobiose, also known as cellose, is generally defined as a disaccharide unit of cellulose. Because it is known that cellobiose inhibits the breakdown of cellulose, it is preferable, although not necessary, to hydrolyze any cellobiose produced by this reaction into glucose in order to increase reaction efficiency. However, it should be noted that the present invention can be practiced without any need for additional cellobiase to be added to the reactor vessels. If one does wish to hydrolyze the cellobiose, gel sphere-entrapped β-glucosidase (also known as cellobiase) enzyme is prepared as follows. Cellobiase, is covalently bonded, in the presence of glutaraldehyde, to gelatin prior to the formation of the gel bead in order to prevent leakage of the cellobiase. Additionally, propylene glycol alginate is added prior to gel bead formation to enhance structural stability. Once, the beads are formed, structural stabilization of the gel beads is subsequently achieved by soaking them in a glutaraldehyde solution. The resulting gel beads are structurally stable for an extended period, during which time the catalytic activity of cellobiase does not decline to any significant extent. These gel beads can be used for the continuous hydrolysis of cellobiose to glucose, as well as other enzymatic processes. A complete description of this technology can be found in U.S. patent application Ser. No. 07/936,162 to Woodward, the entire disclosure of which is incorporated herein by reference. PD-10 columns were purchased from Pharmacia™, Piscataway, N.J. The coomassie blue reagent for determining protein concentration was purchased from BioRad Laboratories™, Richmond, Calif. Almond $\beta$-glucosidase was purchased from Sigma Chemical Company™, St. Louis, Mo. Reducing sugar was measured using the dinitrosalicyclic acid reagent. Glucose was measured using the hexokinase assay reagent.

Various newspapers were used during the experimental runs of the present invention. Plastic canvas (20 mesh or $850\mu$) was obtained from a crafts store. Although the present invention utilized 20 mesh plastic canvas, the mesh or pore size is not considered to be a critical feature of the present invention. The only prerequisite of the material is that it is porous (filled with pores) and that the pores be of a sufficient size or opening so as to provide for the inked fibers to be able to pass through them. One of ordinary skill in the art, without undue experimentation, would able to optimize the pore size or opening of the plastic canvas, or other suitable material, so as to permit the inked fibers of the particular cellulosic material to be able to pass through them. The plastic canvas basket in chamber A acts as a separating and retaining means in that it effectively separates the relatively smaller inked fibers out of chamber A and retains the relatively larger non-inked fibers in chamber A due to pore size. Two cylindrical baskets open at one end were made out of the plastic canvas with the approximate dimensions of 11.75×4.76 cm (length×diameter). Each basket could be placed inside a thermojacketed glass chamber with approximate internal dimensions of 13.02 centimeters (cm)×5.71 cm. The thermojacketed chambers were in fluid communication with each other, via insulated plastic tubing (see FIG. 1). A Pro-Spense™ Microprocessor Controlled Pump (model 78200-02) with a Masterflex™ head (model 7518-00) was purchased from Cole-Parmer Instrument Company™, Chicago, Ill. The pump was in fluid communication with both chambers.

An example of a method for separating non-inked fibers from inked fibers in cellulosic materials, in accordance with one aspect of the present invention, is presented below:

EXAMPLE

The cellulase solution was prepared as follows: Celluclast™ was diluted 5 times using 50 mM sodium acetate buffer, pH 5.0. The solution was then subjected to gel filtration on a disposable PD-10 column packed with Sephadex G-25 M gel equilibrated with the pH 5.0 buffer. The protein concentration of the filtered enzyme was determining to be 19.4 milligrams/milliliter (mg/mL) as determined using the coomassie blue reagent using almond $\beta$-glucosidase as the standard. 500 mL of 50 mM sodium acetate buffer, pH 5.0, were placed in chamber A and, using the circulatory pump, the buffer was moved through to chamber B and continued until air was removed from the tubing connecting the two chambers. The pump is programmable, in that it can make the flow clockwise or counterclockwise for varying time periods. Circulation was continued until the temperature of the buffer was 40° C. and equal volumes of buffer were in chambers A and B. 30 mL of gel sphere-entrapped $\beta$-glucosidase were placed in one of the cylindrical plastic canvas baskets which was then placed in chamber B. Approximately 3 grams (g) of shredded newsprint were placed in the other plastic canvas basket and placed in chamber A. Chamber B was then sealed (if desired, silicone can be used when sealing the chambers). The stirring bars were turned on to ensure thorough mixing in both chambers. The purpose of the mixing is to allow the cellulosic material to be liquified so that it would flow through the tubing. The cellulase solution (0.6–8.0 mL) was then added to chamber A, which was then sealed. The action of cellulase and the mechanical stirring on the newsprint in chamber A resulted in the production of a slurry of newsprint pulp. A small fraction of the starting material was converted to glucose after six hours. The majority of the cellulose in the pulp remained intact, but almost immediately after the start of the reaction, inked fibers were observed to flow to chamber B where they became trapped on the outside of the plastic canvas basket in chamber B. Non-inked fibers remained in chamber A throughout the reaction because they were too large to migrate out of the plastic canvas basket in chamber A. The presence of $\beta$-glucosidase in chamber B ensured that all cellobiase and other short chain oligosaccharides were converted to glucose. It is thought that the action of cellulase in combination with the mixing in chamber A resulted in the release of inked particles which adhered to the smaller fibers that migrated to chamber B. It is important to note that cellulase was essential for the complete pulping of newsprint in this system and without its addition to chamber A, no separation of non-inked from inked fibers occurred. The pump was set at a flow rate of 30 mL/minute to flow counter-clockwise for 9 minutes. The $\beta$-glucosidase in chamber B then acted to break down the cellobiose into glucose. The flow automatically reversed after an additional 9 minutes. This step was repeated throughout the duration of the experimental run which typically lasted about 4 to about 6 hours. After this time, there was a separation of the inked fibers from the non-inked fibers as described. At the completion of the experimental run, the plastic canvas basket was removed from chamber A, and the fibers inside the plastic canvas basket were washed with water and dried. The inked fibers were collected from the outside of the plastic canvas basket of chamber B and other parts of the reactor by draining the reaction medium, followed by filtration. The inked fibers probably did not migrate into the plastic canvas basket of chamber B because either the $\beta$-glucosidase beads prevented their passage through the pores or because of the centrifugal forces generated by the stirring action.

The data obtained from several additional experimental runs using water-based inked newsprint, and where the amount of cellulase added to chamber A was varied, are given in Table 1 below. Table 1 illustrates the effect of cellulase concentration on the separation of non-inked from inked fibers in newsprint.

TABLE 1

| Newsprint (g) | Cellulase added (mL)* | Inked Fibers (g) | Non-Inked Fibers (g) | Glucose (g) |
| --- | --- | --- | --- | --- |
| 3.01 | 0.6 (11.64) | 0.4 | 1.87 | 0.034 |
| 3.02 | 1.0 (19.4) | 0.85 | 1.59 | 0.048 |

TABLE 1-continued

| Newsprint (g) | Cellulase added (mL)* | Inked Fibers (g) | Non-Inked Fibers (g) | Glucose (g) |
|---|---|---|---|---|
| 3.04 | 1.5 (29.1) | 0.96 | 1.45 | 0.058 |
| 2.98 | 2.0 (38.8) | 1.43 | 1.19 | 0.07 |
| 3.05 | 3.0 (58.2) | 1.09 | 1.36 | 0.053 |
| 3.4 | 4.0 (77.6) | 1.45 | 1.48 | 0.1 |
| 2.99 | 6.0 (116.4) | 1.17 | 1.26 | 0.12 |
| 3.03 | 8.0 (155.2) | 1.18 | 1.18 | 0.13 |

*Values in parentheses represent the amount of cellulase protein in milligrams. It should be noted that when less than 3.0 mL of cellulase was used, some intact newsprint was still detectable after six hours.

Using this methodology it appears that there is relatively insignificant enzymatic hydrolysis of cellulose to glucose (approximately 3% conversion of the starting material), and approximately equal amounts of non-inked and inked fibers can be recovered. The addition of 4.0 ML of cellulase appeared to consistently result in virtually complete pulping of the newsprint and separation of the non-inked fibers from the inked fibers.

As illustrated in FIGS. 2 and 3, there is a major difference in the brightness and appearance of the non-inked fibers compared to the inked fibers. The non-inked fibers appear intact and can be recycled and used without further treatment.

The properties of pulp fibers separated from unprinted newsprint and printed newspaper during various experimental runs, in accordance with one aspect of the present invention, are presented in Table 2 below:

TABLE 2

| | Handsheet Grammage (g/m$^2$) | Zero-Span Breaking Length (km)$^A$ | Brightness (%)$^B$ | Fiber Length: Length Weighted Average (mm)$^C$ |
|---|---|---|---|---|
| Unprinted Newsprint | | | | |
| Fibers in Chamber A (Uninked) | 58.18 | 7.48 | 53.5 | 1.38 |
| Fibers in Chamber B (Inked) | 51.16 | 4.49 | 51.9 | 0.44 |
| Printed Newspaper | | | | |
| Fibers in Chamber A (Uninked) | 58.17 | 8.26 | 50.8 | 1.56 |
| Fibers in Chamber B (Inked) | 52.09 | 5.33 | 22.7 | 0.44 |

$^A$Tappi Method T231 cm-85; Instrument: Pulmac ™ Trouble Shooter (Pulmac Instruments, Inc., Montpelier, Vermont)
$^B$Tappi Method T452 om-87; Instrument: Technobrite ™ Micro TB-1c (Technobrite Corp., New Albany, Indiana)
$^C$Instrument: Kajaani ™ FS-200 (Kajaani Electronics Ltd., Kajaani, Finland)

The chemical composition of uninked and inked cellulose fibers obtained from old newsprint during various experimental runs, in accordance with one aspect of the present invention, is illustrated in Table 3 below:

TABLE 3[1]

| Component | Uninked Fibers | Inked Fibers |
|---|---|---|
| Glucose | 50.15$^A$ | 37.2$^A$ |
| Xylose | 8.21 | 7.0 |
| Galactose | 1.68 | 2.72 |
| Arabinose | 1.98 | 1.98 |
| Mannose | 11.49 | 8.64 |
| Klason lignin | 22.32 | 33.85 |
| Acid-soluble lignin | 0.31 | 0.61 |
| Ash | 0.57 | 1.51 |
| Total | 96.71 | 93.51 |

[1]Values are % dry weight of fibers, average of duplicate determinations.
$^A$Value obtained for glucose calculated by a glucose analyzer (YSI, Inc. ™, Yellow Springs, Ohio).

While there has been shown and described what are present considered the preferred embodiments of the invention, it will be obvious to those skilled in the art that various changes and modifications can be made therein without departing from the scope of the invention defined by the appended claims.

What is claimed is:

1. A method for separating non-inked cellulose fibers from inked cellulose fibers in cellulosic materials comprising the steps of:

introducing cellulosic material into a first vessel, the cellulosic material comprising cellulose, the cellulose comprising non-inked cellulose fibers and inked cellulose fibers;

reacting the cellulosic material with cellulase to form a slurry, the reaction causing the cellulosic material to separate into non-inked cellulose fibers and inked cellulose fibers, the slurry comprising non-inked cellulose fibers, inked cellulose fibers, and cellobiose;

transferring the slurry through a first retaining means in the first vessel to retain the non-inked cellulose fibers in the first vessel;

transferring the slurry from the first vessel into a second vessel, the slurry comprising individual inked cellulose fibers, the first vessel being in fluid communication with the second vessel, the second vessel containing cellobiase;

transferring the slurry through a second retaining means in the second vessel for retaining the inked cellulose fibers in the second vessel;

recovering the non-inked cellulose fibers; and recovering the inked cellulose fibers.

2. A method in accordance with claim 1, further comprising the additional step of size reducing the cellulosic material prior to introduction into the first vessel.

3. A method in accordance with claim 1, wherein the first vessel is agitated.

4. A method in accordance with claim 1, wherein the second vessel is agitated.

5. A method in accordance with claim 1, wherein the step of transferring the slurry into the second vessel is accomplished by means of a pump, the pump being in fluid communication with the first vessel and the second vessel.

6. A method in accordance with claim 1, wherein the first retaining means comprises a porous material.

7. A method in accordance with claim 6, wherein the porous material contains a plurality of pores extending therethrough.

8. A method in accordance with claim 7, wherein the pores permit inked cellulose fibers to migrate therethrough.

9. A method in accordance with claim 1, wherein the cellulosic material is paper.

10. A method in accordance with claim 1, wherein the cellulosic material is newsprint.

11. A method in accordance with claim 1, wherein the second retaining means comprises a porous material.

12. A method in accordance with claim 11, wherein the porous material contains a plurality of pores extending therethrough.

* * * * *